(12) United States Patent
Enzendorfer et al.

(10) Patent No.: US 6,509,731 B1
(45) Date of Patent: Jan. 21, 2003

(54) DEVICE FOR MEASURING THE ROTATION OF TOOTHED WHEEL INCLUDING SCREEN FOR WHEEL TEETH

(75) Inventors: Rudolf Enzendorfer, Steyr/Gleink (AT); Günther Nagenkögl, Steyr (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 09/516,242

(22) Filed: Mar. 1, 2000

(30) Foreign Application Priority Data

Mar. 5, 1999 (AT) .............................. 151/99 U

(51) Int. Cl.$^7$ .............................. G01P 3/488; G01B 7/30; H05K 9/06; H04B 15/00
(52) U.S. Cl. .................................. 324/173; 324/207.12
(58) Field of Search .................................. 324/173, 174, 324/160, 168, 207.12, 207.25

(56) References Cited

U.S. PATENT DOCUMENTS 4,611,168 A * 9/1986 Kudelski et al. ............ 324/174
4,989,574 A * 2/1991 Abe ...................... 324/207.25

FOREIGN PATENT DOCUMENTS

DE 3931948 4/1997
DE 19625489 1/1998

\* cited by examiner

Primary Examiner—Walter E. Snow
(74) Attorney, Agent, or Firm—Dykema Gossett PLLC

(57) ABSTRACT

A device for measuring the rotational speed of a rotating body, in particular a toothed wheel, is provided with a variable-inductance speed pick-up which is mounted in a housing and faces an annular measurement zone of a rotating body having at least one measurement-sensitive discontinuity of measurement. The rotating body is further provided with at least one disturbance zone with at least one disturbance discontinuity that influences the measurement. In order to improve the quality of the measurement it is provided that at least one screen is arranged between the disturbance zone and the speed pick-up.

7 Claims, 1 Drawing Sheet

DEVICE FOR MEASURING THE ROTATION OF TOOTHED WHEEL INCLUDING SCREEN FOR WHEEL TEETH

BACKGROUND OF THE INVENTION

The invention relates to a device for the measurement of the rotational speed of a rotating body, in particular a toothed wheel, with a variable-inductance speed pick-up which is mounted in a housing and faces an annular measurement zone of a rotating body having at least one measurement-sensitive discontinuity of measurement, with the body having at least one disturbance zone with at least one measurement-sensitive disturbance discontinuity, with at least one screen being arranged between the disturbance zone and the speed pick-up.

DESCRIPTION OF THE PRIOR ART

It is known to measure the rotational speed of a rotating body by means of a variable-inductance speed pick-up. The rotational speed is determined in this process by fluctuations of the magnetic flux density as a result of measurement-sensitive discontinuities on the rotating body such as accumulations of material like pins or reductions of material such as grooves in a sharply defined measurement zone. If the rotating body is provided with further discontinuities of material outside of the measurement zone, however, they can disturb the measuring signal and negatively influence the speed measurement. If the rotating body is formed by a toothed wheel for example in which the measurement zone is disposed close to the teeth of the toothed wheel, the toothed wheels will cause electronic noise which negatively influences the speed signal.

From DE 39 31 948 C3 an electronic detection apparatus with an interference suppression part made of magnetic material is known which is arranged in such a way about a magnetic coil that it dampens the noise bursts reaching the magnetic coil. The disturbance and noise signals are produced according to the fluctuations of an external magnetic field as a result of the current for the starter and charging current from an a.c. generator.

SUMMARY OF THE INVENTION

It is the object of the present invention to improve the measurement quality in a device of the kind mentioned above.

This occurs in accordance with the invention in such a way that the screen is arranged in the axial direction between the disturbance zone and the speed pick-up. The screen, preferably made of ferromagnetic material, screens the disturbance discontinuities at least to such an extent that they can no longer exert any disturbing influence on the speed signal anymore. If the rotating body is a toothed wheel and if the disturbance discontinuities are caused by the teeth of the toothed wheel, the screen is arranged between the speed pick-up and the teeth of the toothed wheel.

It is provided for in a preferred embodiment of the invention that the screen is rigidly connected with the housing. If the housing per se consists of ferromagnetic material, parts can be saved and the production expenditure can be reduced when the screen is provided with an integral (one-piece) arrangement with the housing.

It is provided for in a particularly preferred embodiment of the invention that the measurement axis of the speed pick-up is arranged parallel to the rotational axis of the body and the measurement discontinuity is formed by at least one projection, preferably a pin, or at least one recess, with a minimal radial distance being provided between the screen and the measurement discontinuity. The screen is appropriately provided with the shape of an annulus segment which allows a particularly compact arrangement.

BRIEF DESCRIPTION OF THE DRAWINGS

The invention is now explained in closer detail below by reference to the enclosed drawings, wherein.

DETAILED DESCRIPTION OF THE PREFERRED EMBODIMENTS

Figure 1:
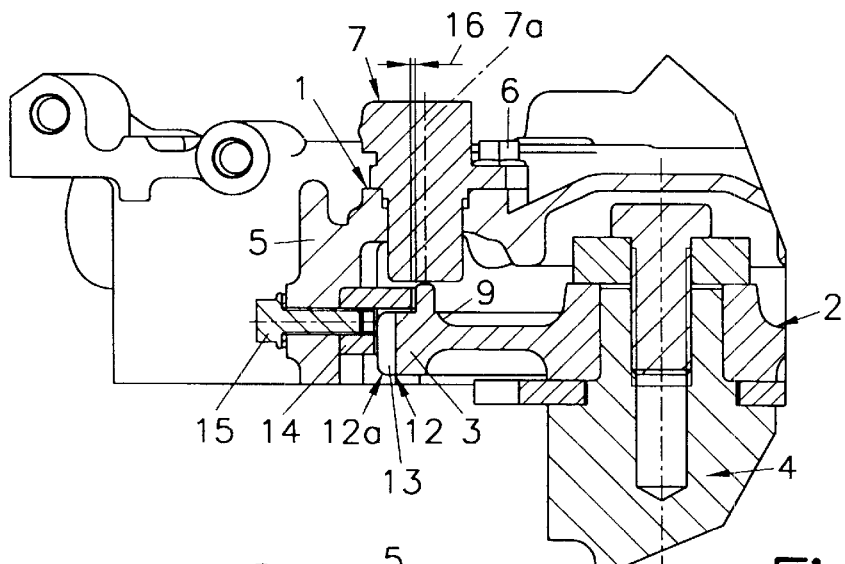
FIG. 1 shows a sectional view through the device in accordance with the invention along line I—I in FIG. 2.
Figure 2:
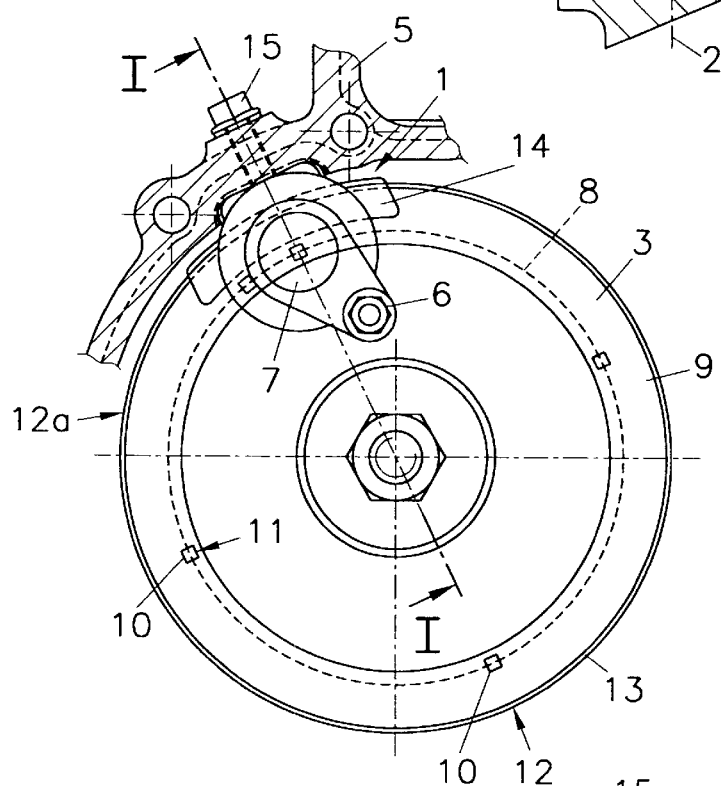
FIG. 2 shows a face view of said device.

The device 1 for measuring the rotational speed of the rotating body 2, which in the embodiment is a toothed wheel 3 of a camshaft 4 of an internal combustion engine, is provided with a variable-inductance speed pick-up 7 which is fastened in a housing 5 by screws 6. The speed pick-up 7 faces an annular measuring zone 8 on one face side 9 of the toothed wheel 3. The measuring axis 7a is arranged approximately parallel to the rotational axis 2a of the rotating body. Several measurement discontinuities 11 which are formed by projecting pins 10 are provided on toothed wheel 3 within the measurement zone 8, which measurement discontinuities change the magnetic flux as a result of speed pick-up 7. The changes thus produced in the inductivity are interpreted and evaluated as speed signals. Measurement discontinuities 11 such as recesses or grooves, notches or the like can be used instead of projections such as pins 10.

In addition to the measurement discontinuities 11, the rotating body 2 is provided with further disturbance zones 12a with disturbance discontinuities 12 which have an influence on the measurement. In the present embodiment the teeth 13 of the toothed wheels 3 represent the disturbance discontinuities 12 which can cause electronic noise during the measurement. This noise can have a negative influence on the speed signal. In order to avoid this, a screen 14 is arranged between the disturbance discontinuities 12 (i.e., the teeth 13 of the toothed wheel) and the speed pick-up 7, which screen is fastened to housing 5 by means of screws 15. It is also possible to provide the screen 14 with an integral arrangement with the housing 5 and to bring the same into the desired shape by mechanical working.

Screen 14 is disposed directly outside of the annular measuring zone 8 with the measurement discontinuities 11, so that the distance 16 between the screen 14 and the measurement discontinuities 11 is as small as possible.

Figure 3:
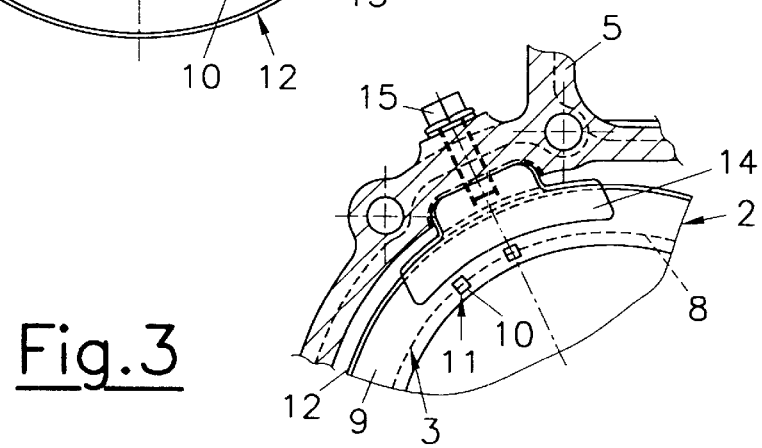
FIG. 3 shows a detailed view of FIG. 2 with a dismounted speed pick-up.

The screen 14 is provided with the shape of a substantially annular segment, as is shown most clearly in FIG. 3, and appropriately consists of ferromagnetic material such as iron, nickel or a respective alloy.

What is claimed is:

1. A device for measuring the rotational speed of a rotating toothed wheel which includes teeth and which defines an annular measurement zone having at least one measurement-sensitive discontinuity for measurement, comprising a variable-inductance speed pick-up which is mounted in a housing and faces said annular measurement zone, and at least one screen axially located between said teeth of the toothed wheel and said speed pick-up.

2. A device according to claim 1, including means to rigidly attach said screen to the housing.

3. A device according to claim 1, wherein the screen is one piece with the housing.

4. A device according to claim 1, wherein a measurement axis of the speed pick-up is arranged parallel to a rotational axis of the body and the measurement discontinuity is formed by at least one projection or at least one recess, with a minimal radial distance being provided between the screen and the measurement discontinuity.

5. A device according to claim 1, wherein the screen substantially comprises the shape of an annular segment.

6. A device according to claim 1, wherein the screen consists of a ferromagnetic material.

7. A device for measuring the rotational speed of a rotating toothed wheel which includes teeth and which defines an annular measurement zone having at least one measurement-sensitive discontinuity for measurement, comprising a variable-inductance speed pick-up which is mounted in a housing and faces said annular measurement zone, and at least one screen axially located between said teeth of the toothed wheel and said speed pick-up, said screen being substantially shaped as an annular segment.

* * * * *